United States Patent [19]

Fisher et al.

[11] Patent Number: 5,017,917

[45] Date of Patent: May 21, 1991

[54] RESTRICTION OF COMMUNICATION SERVICE ACCESSIBILITY AMONG SUBSCRIBER COMMUNITIES

[75] Inventors: Thomas S. Fisher, Westminster; Martin R. Losty, Broomfield, both of Colo.

[73] Assignee: AT&T Bell Laboratories, Murray Hill, N.J.

[21] Appl. No.: 292,295

[22] Filed: Dec. 30, 1988

[51] Int. Cl.$^5$ ................................................ H04Q 3/00
[52] U.S. Cl. ............................ 340/825.79; 340/825.3; 379/197; 379/244
[58] Field of Search ............... 379/197, 196, 244, 245, 379/246, 248; 340/825.3, 825.31, 825.34, 825.79; 364/200, 900

[56] References Cited

U.S. PATENT DOCUMENTS

| | | | |
|---|---|---|---|
| 3,692,951 | 9/1972 | Hestad et al. | 379/244 X |
| 3,736,383 | 5/1973 | Le Baron | 379/197 |
| 4,259,549 | 3/1981 | Stehman | 379/244 X |
| 4,799,255 | 1/1989 | Billinger et al. | 379/244 X |

OTHER PUBLICATIONS

United States Department of Commerce Telephone Directory, Mar. 1987, p. VI.
AT&T System 85 Release 2, Versions 1-4 Features Reference Manual, Issue 1 (Jul. 1987) pp. 109-1 to 109-13.

*Primary Examiner*—Ulysses Weldon
*Attorney, Agent, or Firm*—David Volejnicek

[57] ABSTRACT

Subscribers (100-108) of an electronic mail system (1-2) service are divided into a plurality of subscriber communities (30-34). Subscribers in each community have common rights of access to one or more communication service—the sending and receiving of mail messages—which rights are generally different from those of subscribers in other communities. Permissions to send and receive messages between any two communities are specified on each mail system in a permissions matrix (40), wherein each row (41) represents a different sender community, each column (42) represents a different recipient community, and the value stored at their intersection (43) indicates the permission vis-a-vis the two communities. A function (50) is invoked on the sender's mail system (1,2) at message addressing, and on the sender's and recipients' mail systems (1,2) at message delivery, to enable or prevent (FIG. 3) message sending or delivery according to the matrix-specified permissions. Optionally, a message-associated permission (410) may be used to override matrix-specified permissions.

23 Claims, 4 Drawing Sheets

RESTRICTION OF COMMUNICATION SERVICE ACCESSIBILITY AMONG SUBSCRIBER COMMUNITIES

TECHNICAL FIELD

This invention relates to communication systems generally, and particularly relates to the allocation of, or restriction of access to, communication services among system users.

BACKGROUND OF THE INVENTION

Most communication systems are versatile in that they provide a variety of services, or capabilities, to their users—not just one service or capability. Even as simple a communication system as two transceivers interconnected by a wire may be thought of as providing a user connected to one of the transceivers with at least two capabilities: the capability to transmit communications over the wire, and the capability to receive communications over the wire.

Often, it is desirable to limit access by different users, or different communities of users, to different subsets of the total capabilities provided by the system, while allowing those users or user communities to share use of the system. For this purpose, the art has made use of the notion of a "class-of-service". A "class-of-service" is a specification of the communication-related capabilities that are available to a user. A number of different classes are defined, and different users are assigned to those different classes.

SUMMARY OF THE INVENTION

We have realized that an unfortunate limitation of the "class-of-service" concept is that the capabilities to which a user is restricted by his or her "class-of-service" are fixed, in the sense that they do not vary depending upon whom the user is communicating with. The "class-of-service" concept therefore does not have the flexibility necessary to easily define, redefine, and implement such flexible relationships among communication service users as may be desired. For example, in an electronic voice mail service system used by a trucking company, drivers often leave so many messages for each other that the system becomes overloaded and the company dispatcher cannot send messages to the drivers. It would therefore be desirable to restrict drivers from sending messages to each other, yet still allow them to send messages to the dispatcher, and also allow the dispatcher to send messages to the drivers. However, such selective message-sending restrictions are not easily implemented via the "class-of-service" concept, in large measure because classes of service and communities of interest typically do not share the same boundaries. For another example, in an electronic voice-mail service system used by a large, hierarchically-structured, company, lower-ranked personnel often bypass their direct line of management and send messages to higher-level executives who are either not in their line of management or many levels above them. This tends to interfere with the proper operation of the organizational structure and wastes the executives' time. It would therefore be desirable to restrict employees to sending messages to their subordinates, peers, and next-level managers, thereby allowing full message-sending capability down the corporate hierarchy but severely limiting the message-sending capability up the corporate hiearchy. Again, such selective message-sending restrictions are not easily implemented via the "class-of-service" concept.

This invention is directed to overcoming these and other limitations and disadvantages of the prior art. According to the invention, users of a communication system are assigned to user communities, and communication permissions—that is, right of access to one or more communication services—are defined for each user community with respect to individual ones of the other user communities. Permissions are thereby defined between each pair of communities, which permissions may vary from pair to pair. Illustratively, definitions of the permissions are implemented in a matrix of intersecting rows and columns, wherein the rows and the columns represent the different communities and the permissions between any two communities are defined at the intersection of their corresponding row and column. When a communication is attempted between two users, the two user's assigned communities are determined, and are in turn used to determine from the defined permissions whether the attempted communication is permitted. If the communication is permitted, it is enabled to proceed; if it is not permitted, it is prevented from occurring.

By defining separate permissions for each pair of communities, the arrangement characterized above conditions a user's access to a communication service on who the user is attempting to communicate with. A single user may therefore have different communication permissions vis-a-vis different other users. This allows much more flexible tailoring of the use of a communication system than has hitherto been easily possible. For example, this arrangement facilitates implementation of the communication restrictions found desirable in the two examples discussed in the Background portion of this specification.

Furthermore, the assignment and definition of a user's communication permissions may be made hereby in addition to, and independently of, the user's assigned class-of-service. Consequently, this arrangement is fully compatible with the concept of class-of-service, and both may be implemented in a single communication system without mutual interference.

These and other advantages and features of the invention will become more apparent from the following description of an illustrative embodiment of the invention considered together with the drawing.

DETAILED DESCRIPTION

Figure 1:
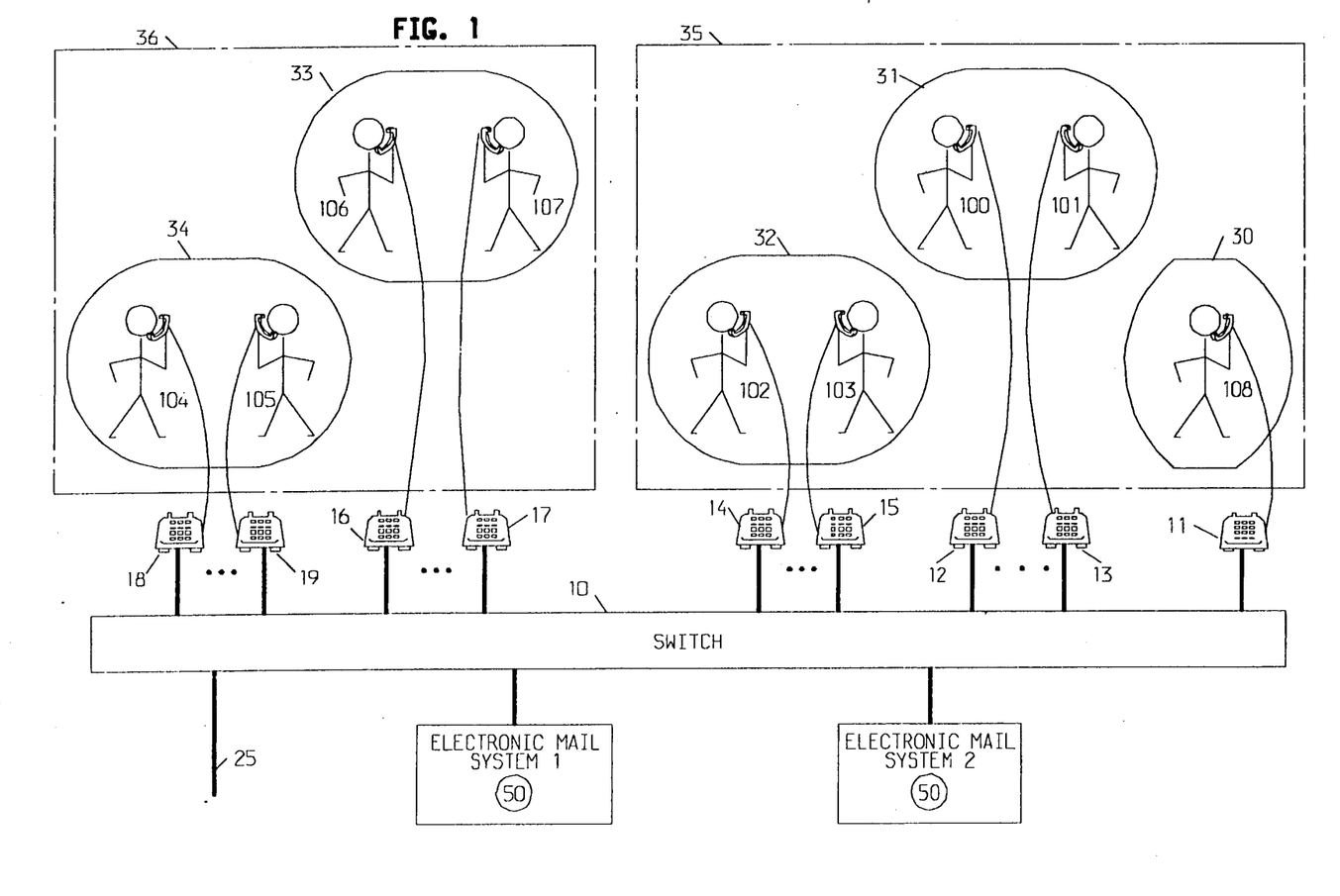
FIG. 1 is a block diagram of an electronic mail service system including an illustrative embodiment of the invention.

FIG. 1 shows an illustrative communication system. The shown system is a private communication system, such as might be owned by, and operated to provide communication services on the premises of, a business. The system comprises a plurality of user stations or terminals 11–19—Touch-Tone telephones, for example—interconnected for communication by a switch 10—such as an AT&T System 75 or 85 PBX. The switch further has trunk 25 connections to other communication systems, such as the public network, to provide terminals 11–19 with communicative access to the outside world. Also connected to switch 10 are one or more electronic mail systems 1–2—the AT&T AUDIX voice-mail service systems, for example—which provide the users of terminals 11–19 with electronic mail services. Each mail system 1,2 forms a subsystem of the communication system of FIG. 1, and different subscriber terminals 11–19 and their associated subscribers 100–108 are assigned to be serviced by different mail systems 1–2; for example, terminals 11–15 and their associated subscribers 108, 100–101, and 102–103 are assigned to system 1, while terminals 16–19 and their associated subscribers 106–107 and 104–105 are assigned to system 2. However, any subscriber 100–108 may use any terminal 11–19 or any other terminal to access his or her assigned mail system 1,2. As described so far, the communication system of FIG. 1 is conventional.

Subscribers 100–108 to the communication services of the system of FIG. 1 are assigned by a system administrator to different subscriber or user communities, or groups, on the basis of their individual rights, or permissions, to communicate with fellow subscribers. Members of a community have the same communication permissions. Five such communities 30–34 are shown in FIG. 1: subscriber 108 belongs to community 30, subscribers 100–101 belong to community 31, subscribers 102–103 belong to community 32, subscribers 106–107 belong to community 33, and subscribers 104–105 belong to community 34. Any number of subscribers may be assigned to a community.

Figure 2:
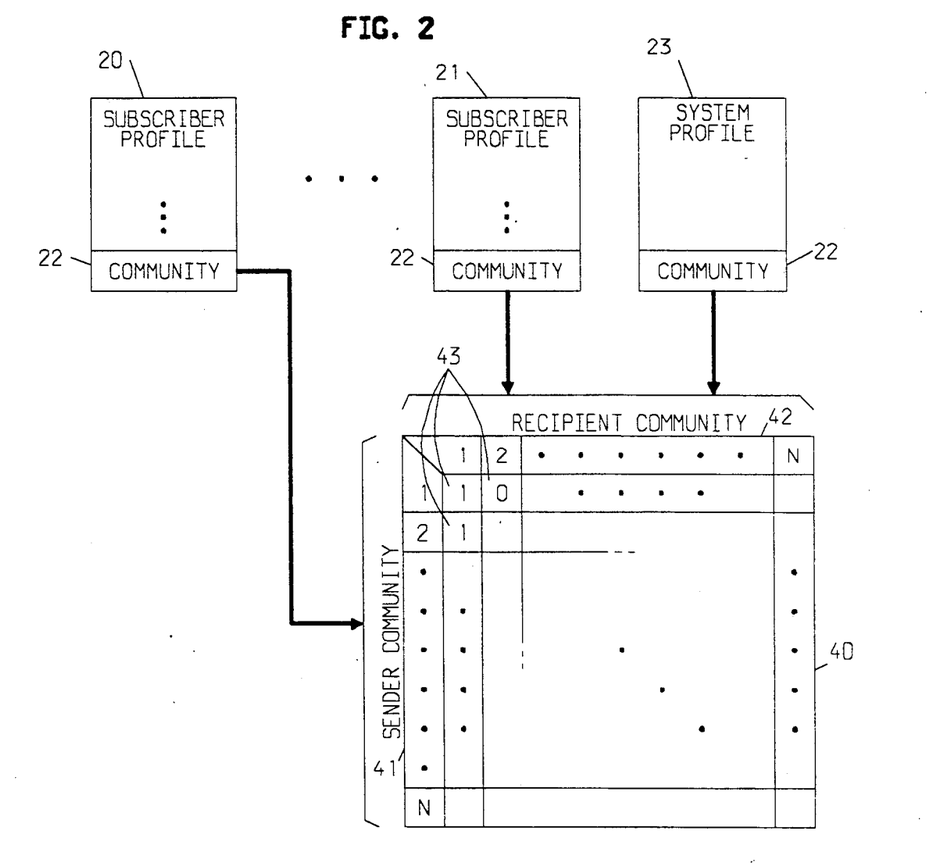
FIG. 2 is a block diagram of permissions-specifying structures of the system of FIG. 1 for a first embodiment of the invention.

Turning to FIG. 2, each subscriber 100–108 has a subscriber profile 20,21 stored in the mail system 1-2 to which it is assigned. A subscriber profile 20,21 is a conventional data structure that provides to mail system 1,2 the information required by that system to service the subscriber. According to the present invention, however, each subscriber profile has been expanded to include an additional entry referred to herein as a community entry 22. Entry 22 specifies the subscriber community 30–34 or group to which the subscriber associated with that profile 20,21 has been assigned.

Similarly to terminals 11–14, each mail system 2 with which a given mail system 1 can communicate has its own system profile 23 stored on the given mail system 1, which profile 23 provides to the given mail system 1 the information needed by the given system 1 to communicate with the other system 2. The other systems' profiles are likewise expanded to include a community entry 22. The community that is identified by a system profile 23 community entry 22 is in fact a super-community or a default community, in that it encompasses all subscribers of the other system 2 who do not have their own subscriber profiles 20,21 in the given system 1—irrespective of which communities those subscribers may actually be assigned to on their local system 2. Two such super-communities 35,36 are shown in FIG. 1: super-community 35 is shown as encompassing subscribers of system 1 while super-community 36 is shown as encompassing subscribers of system 2.

Typically, assignment of a subscriber to a particular community 30–34 is done by an administrator of system 1,2 and the information is entered into the subscriber's entry 22 during system 1,2 initialization. A typical characteristic of, and criterion for assignment of a subscriber to, a community 30–34 is that the subscriber members of the same community 30–34 have the same communication permissions. The permissions of one community 30–34 typically are, but need not be, different from the permissions of another community 30–34. This is illustrated by the following examples. Example 1: subscribers of communities 30 and 31 may have permissions to send/receive messages to/from other members of their own community, whereas subscribers of community 32 may not have permission to communicate among themselves. Example 2: subscribers of community 30 may have permissions to send messages to subscribers of communities 31, 32, and 33, but may have permissions to receive messages from subscribers of communities 31, 32, and 34. Example 3: subscribers of community 31 may have permission to send and receive messages to/from community 30; communities 33 and 34 may have permissions to receive messages from community 30 but not to send messages to community 31 but not to receive messages from community 31, etc. As the above examples illustrate, almost any imaginable combination of permissions may be assigned to a community vis-a-vis its own members or the members of any other community; separate permissions exist for the two directions of sending messages between any two communities, and these permissions need not be symmetrical; and the permissions between any two groups need not even be consistent between systems 1,2 (i.e., that a first community has permission to send messages to a second community in one system 1 does not necessarily mean that the first community has permission to send messages to the second community in another system 2).

The subscriber communities' permissions are represented on each system 1,2 by a permissions matrix 40. Each system 1,2 stores its own matrix 40. Rows 41 of each matrix 40 each represent a different community 30–34 or super-community 35–36 that can be identified by entries 22 on that system 1,2. Columns 42 of each matrix 40 do the same. Each community served by another system 1,2 is identified in rows 41 and columns 42 of matrix 40 of a local system 1,2 in the same manner as the communities of the local system are identified therein. Rows 41 illustratively represent communities 30–34 and super-communities 35–36 in their role as mail senders, and columns 42 illustratively represent communities 30–34 and super-communities 35–36 in their role as mail receivers. A "zero" or "one" value stored at the intersection 43 of any row 41 and any column 42 identifies the permission for the community or super-community represented by the row to send mail to the community or super-community represented by the column, and for the community or super-community represented by the column to receive that mail. For example, a "one" stored at the intersection of a row 41 and a column 42 both of which represent community 30 would indicate that subscribers of community 30 can send mail to and receive mail from each other, while a "zero" stored at that intersection would indicate that subscribers of community 30 cannot communicate among themselves through the mail system. A "one" stored at the intersections of both a row 41 representing community 30 and a column 42 representing community 32, and a row 41 representing community 32 and a column 42 representing community 30 would indicate that the communities can both send mail to and receive mail from each other, whereas a "zero" stored at those intersections would indicate that the two communities 30 and 32 cannot communicate with each other through the mail system. And a "one" stored at the intersection of a row 41 representing community 31 and a column 42 representing community 32 along with a "zero" stored at the intersection of a row 41 representing community 32 and a column 42 representing community 31 would indicate that community 31 can send mail to community 32 and community 32 can receive that mail, but that community 32 cannot send mail to community 31.

Figure 3:
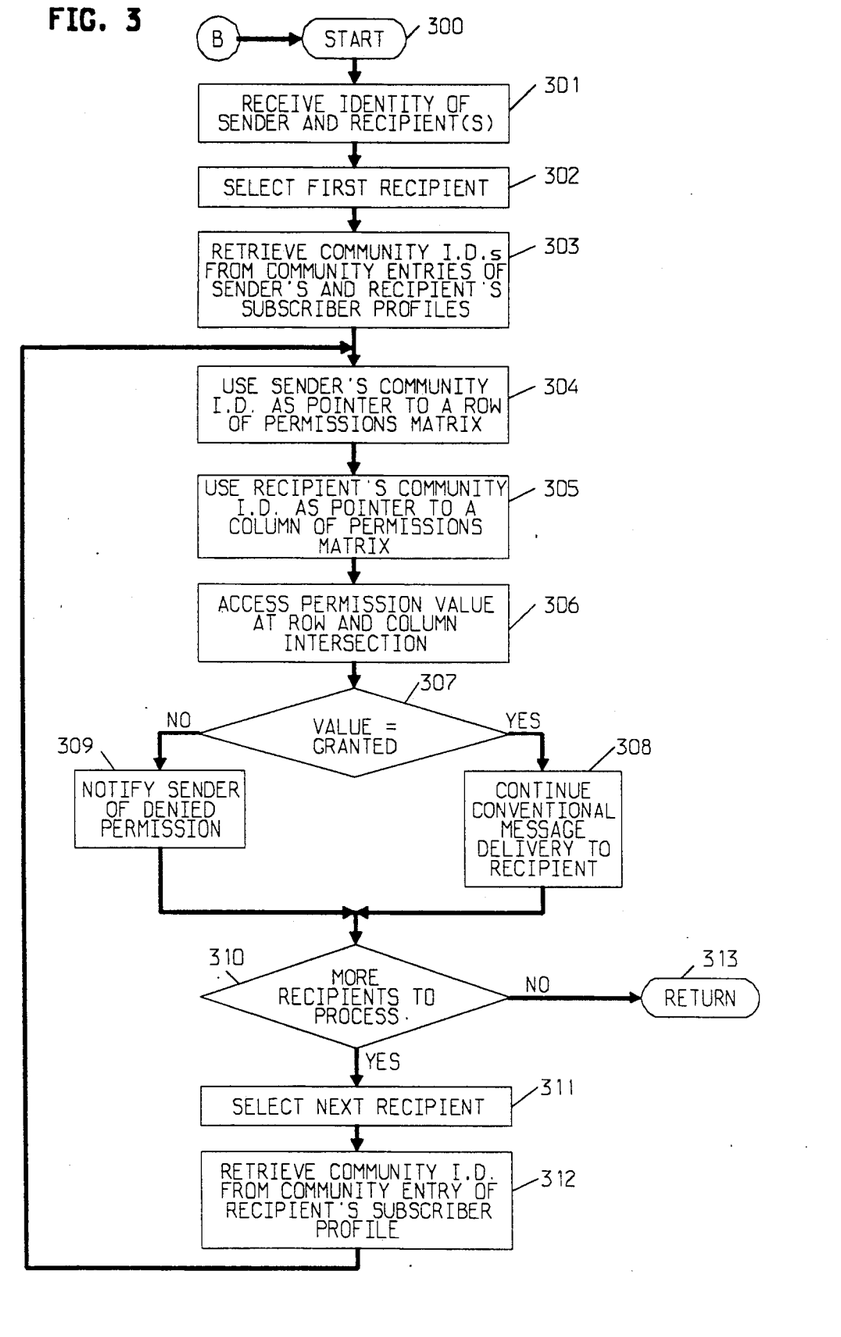
FIG. 3 is a flow diagram of a permissions-handling function of the system of FIG. 1, for the first embodiment of the invention.

In operation, systems 1 and 2 use community entries 22 of profiles 20, 21, 23 and matrices 40 in the manner shown in FIG. 3.

A user of a terminal 11-19 establishes a connection through switch 10 to system 1 or 2 to which it is assigned in a conventional manner, and obtains mail services therefrom in a conventional manner. However, when the user seeks to send mail to another one or more users and specifies those recipients to system 1 or 2 (i.e., addresses the message), system 1 or 2 invokes function 50, at step 300, to execute in system 1 or 2.

Upon invocation at step 300 of FIG. 3, function 50 receives the identity—illustratively the name and/or the electronic address—of the sender and of the one or more recipients of the electronic mail, at step 301. Illustratively, this information is forwarded to function 50 upon its invocation, or function 50 retrieves the information from a predetermined place in memory of system 1 or 2.

Recipients may be designated by the name of a list of recipients. Function 50 treats each recipient specified by the list as a separate individual recipient.

Having received the identity of the recipients at step 301, function 50 then selects a first one of the one or more recipients, at step 302, and retrieves the sender's and the selected recipient's community I.D.'s from community entries 22 of their respective subscriber profiles 20, 21, or—if the recipient is on a remote system and does not have a subscriber profile on the local system—system profile 23, at step 303. Function 50 then uses the sender's community I.D. as a pointer to identify and select the sender's associated one of the rows 41 of permissions matrix 40, at step 304, and uses the recipient's community I.D. as a pointer to identify and select the recipient's associated one of the columns 42 of permissions matrix 40, at step 305. Function 50 then accesses the permission value stored in matrix 40 at the intersection of the selected row 41 and column 42, at step 306, to determine whether the value is a "zero" or a "one", at step 307.

If the value is a "zero", permission is denied to communicate the mail message to the intended recipient, and function 50 notifies the sender thereof, at step 309. Illustratively, function 50 causes a pre-recorded announcement to be played back to the sender. If the permissions value is determined to be "one" at step 307, permission is granted to communicate the message to the intended recipient, and function 50 causes conventional message delivery functions to be performed, at step 308. Illustratively, function 50 invokes a conventional message-scheduling function to be invoked.

Following step 308 or 309, function 50 checks whether there are more recipients to process, at step 310. If all recipients have been processed, function 50 returns to the point in mail system operation from whence it was invoked, at step 313. If all recipients have not been processed, function 50 selects the next recipient for processing, at step 311, retrieves the selected recipient's community I.D. from community entry 22 of the recipient's subscriber profile 20, 21, or—if the recipient is on a remote system and does not have a subscriber profile on the local system—system profile 23, at step 312, and then returns to step 304.

As was mentioned in conjunction with steps 300 and 309, invocation of function 50 at the mail-message addressing stage results in the message being scheduled for delivery to the recipient if proper permissions exist. But there may be a significant time delay between the scheduling of a message for delivery and the time of delivery itself, during which time permissions may change. Also, delivery may take place on a remote system 1,2 whose permissions are different from the permissions of the sender's local system. Therefore, function 50 is also invoked at step 300 on the sender's local system 1 or 2 and on each recipient's local system 1 or 2 at the time of delivery of the mail message. At this time, performance of step 308 involves the actual delivery of the mail message into the recipient's mailbox. On the other hand, performance of step 309 at the time of message delivery involves sending to the sender's local system 1 or 2 and placing in the sender's mailbox a message indicating that the message could not be delivered to the recipient because of denied permissions.

Figure 4:
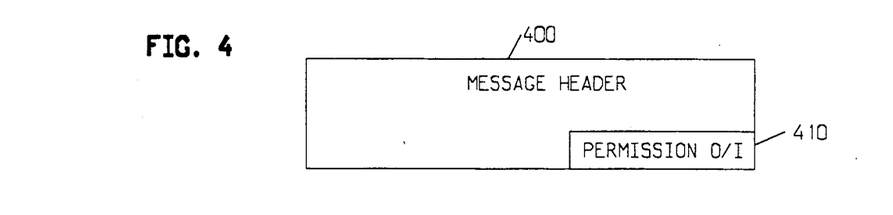
FIG. 4 is a block diagram of permissions-specifying structures additional to those of FIG. 2 for a second embodiment of the invention.

As an extension of the above feature, a permission may further be associated with a mail message itself, which overrides the permissions associated with the sender-recipient subscriber pair's communities in matrix 40. This permission is indicated by a new permission field 410 of the conventional message header 400 of the message, as shown in FIG. 4. The permission that is associated with the message is context-dependent: its value is determined by the status of the message sender at the time that he or she is sending the message. For example, in a mail system 1 or 2 that allows a conventional guest-host relationship to exist between certain users, guests and host can always send messages to each other, regardless of the permission values specified by permissions matrix 40. In such a system, messages sent either by a sender having the status of a guest user, or by a user having the status of a host with respect to the recipient, may automatically have a permission value of "one" associated therewith in permission field 410, which value overrides any relevant matrix 40 permissions and causes the message to be delivered to the recipient unconditionally. On the other hand, messages sent by other senders may automatically have a permission value of "zero" associated therewith in permission field 410, which value indicates that permissions specified by matrix 40 control the sending and delivery of the associated message.

Figure 5:
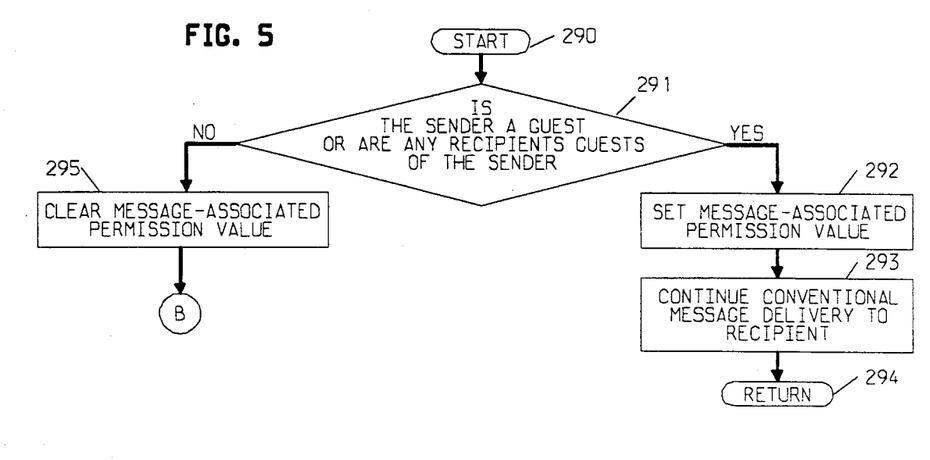
FIGS. 5 and 6 are flow diagrams of extensions to the function of FIG. 3 for the second embodiment of the invention.
Figure 6:
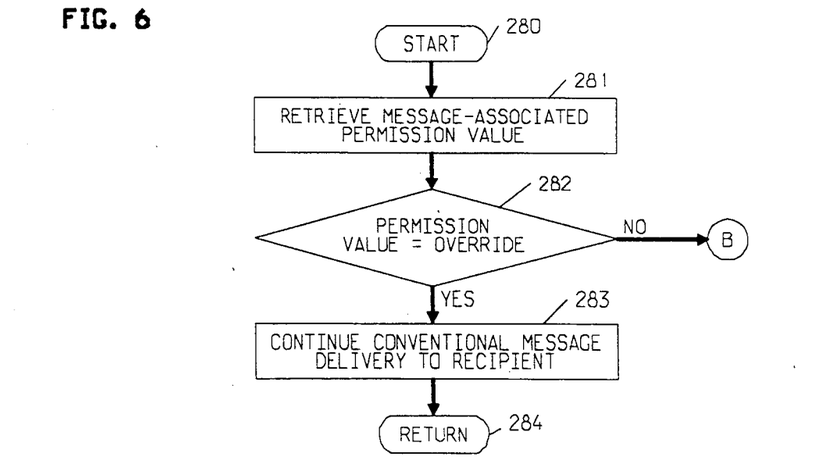

In the implementation where mail messages have associated permissions, the permissions-processing function shown in FIG. 3 is expanded in the manner shown in FIGS. 5 and 6.

When the sender addresses the mail message, system 1 or 2 invokes function 50 not at step 300, but at step 290 of FIG. 5. Upon invocation, function 50 checks whether the sender is a guest or whether any recipients are guests of the sender, at step 291. Host and guests share a subscriber profile 20,21 so that check is preformed by determining whether the sender and any of the recipients have the same one subscriber profile 20,21. If so, function 50 sets permission field 410 of the message's header 400 to a "one" to indicate that this message is to be delivered unconditionally, at step 292. Function 50 then continues with conventional message delivery activities, at step 293. These activities are those described for step 308 of FIG. 3. Thereafter, function 50 merely returns to the point of its invocation, at step 294.

If it is determined at step 291 that neither the sender nor any of the recipients have the status of guests, function 50 clears permission field 410 of message header 400 to indicate that sending and delivery of this message are conditioned by relevant permissions in matrices 40, at step 295. Function 50 then continues operation with the activities shown in FIG. 3.

As was mentioned previously, function 50 is invoked again at the time of delivery of the mail message, on the sender's local system 1 or 2 and on each recipient's local system 1 or 2. This time, however, function 50 is invoked at step 280 of FIG. 6, not at step 290 of FIG. 5.

Upon its invocation at step 280, function 50 retrieves the permission value stored in permission field 410 of the message's header 400, at step 281, and checks it to determine if it is set to "one" to indicate override of matrix 40 permissions, at step 282. If so, function 50 continues with conventional message delivery activities, at step 283. These activities are those described for step 308 of FIG. 3. Thereafter, function 50 merely returns to the point of its invocation, at step 284.

If it is determined at step 282 that the message-associated permission is not set to override matrix 40 permissions, function 50 continues operation with the activities shown in FIG. 3.

Of course, various changes and modifications to the illustrative embodiment described above will be apparent to those skilled in the art. For example, the sender and recipient need not be human users of an electronic mail system, but may be any other conceivable entities—communicating processes executing in a computer, for example. Or, permissions need not be specified via a matrix format; any suitable format may be used—tabular format, for example. Furthermore, when permissions to services in addition to the sending and receiving of messages need be specified, a plurality of matrices may be used to specify those permissions, one per each service. This plurality of matrices may be either a plurality of physically-distinct matrices, or a plurality of logical matrices represented by a plurality of values at each row and column intersection of a single physical matrix. Also, all subscriber communities served by a remote system may automatically be treated as a single super-community on a local system. Such changes and modifications can be made without departing from the spirit and the scope of the invention and without diminishing its attendant advantages. It is therefore intended that such changes and modifications be covered by the following claims.

What is claimed is:

1. An arrangement comprising:
    first means for assigning persons who are users of a communication system to ones of a plurality of user communities;
    second means for defining, for each one of said user communities, communication permissions with respect to individual ones of the other user communities;
    third means responsive to an attempted communication between two persons who are users for identifying the two users and determining the two identified users' assigned communities;
    fourth means responsive to the determination of the two users' assigned communities for determining from the second means whether the attempted communication between the two persons is permitted; and
    fifth means responsive to a determination that the attempted communication is permitted for enabling the communication, and further responsive to a determination that the attempted communication is not permitted for preventing the communication.

2. The arrangement of claim 1 wherein
    the first means comprise
    a plurality of means, one associated with each user, for assigning each user to a community of the plurality of user communities.

3. The arrangement of claim 1 wherein
    the second means comprise
    means for defining the communication permissions for each pair of the user communities.

4. The arrangement of claim 2 wherein
    the third means comprise
    means responsive to an attempt by a first user to communicate with a second user for determining from the first and the second user's assigning means the first and the second user's assigned communities.

5. The arrangement of claim 1 wherein
    the fourth means comprise
    means for determining from the second means whether the attempted communication is permitted between the two user's assigned communities.

6. The arrangement of claim 2 wherein
    each assigning means comprise
    a community entry of a user's subscriber profile.

7. The arrangement of claim 1 wherein
    the second means comprise
    at least one matrix each comprising a plurality of intersecting rows and columns, each row of a matrix corresponding to a different community and each column of a matrix corresponding to a different community, each row and each column of a matrix defining a permission at their intersection.

8. The arrangement of claim 7 wherein
    the at least one matrix comprises
    a plurality of matrices each defining permissions for a different one of a plurality of types of communications.

9. The arrangement of claim 7 wherein
    each row of a matrix corresponds to one of a communication sender and receiver community, and wherein each column of a matrix corresponds to the other of a communication sender and receiver community.

10. The arrangement of claim 1 for a communication system having a plurality of subsystems each serving at least one of the system users, wherein
    the second means comprise
    means in each one of the subsystems for defining, for each user community, permissions with respect to individual ones of the other user communities; and wherein
    the fourth means comprise
    sixth means in the subsystem serving a first one of the two users, for determining from the defining means of the subsystem serving the first user whether the attempted communication is permitted, and seventh means in the subsystem serving a second one of the two users, for determining from the defining means of the subsystem serving the second user whether the attempted communication is permitted; and wherein the fifth means comprise means responsive to a determination by both the sixth and the seventh means that the communication is permitted for enabling the communication, and further responsive to a determination by either the sixth means or the seventh means that the attempted communication is not permitted for preventing the communication.

11. The arrangement of claim 10 wherein the first means comprise means in each one of the subsystems for assigning users of the communication system to ones of a plurality of user communities; wherein the third means comprise eighth means in the subsystem serving the first user for determining the two user's assigned communities in the subsystem serving the first user, and ninth means in the subsystem serving the second user for determining the two user's assigned communities in the subsystem serving the second user; wherein the sixth means are responsive to the determination by the eighth means of the two user's assigned communities; and wherein the seventh means are responsive to the determination by the ninth means of the two user's assigned communities.

12. An arrangement comprising:

first means for assigning users of a communication system to ones of a plurality of user communities;

second means for defining, for each one of said user communities, communication permissions with respect to individual ones of the other user communities;

third means responsive to an attempted communication between two users for determining the two users' assigned communities;

fourth means responsive to the determination of the two user's assigned communities for determining from the second means whether the attempted communication is permitted;

fifth means responsive to a determination that the attempted communication is permitted for enabling the communication;

sixth means for specifying an overriding permission for an attempted communication; and seventh means responsive to an overriding permission having been specified for the attempted communication by the sixth means, for enabling the communication irrespective of the permissions defined by the second means; and wherein the fifth means are further responsive to both (a) an overriding permission not having been specified for the attempted communication and (b) a determination by the fourth means that the attempted communication is not permitted, for preventing the communication.

13. An arrangement comprising:

first means for assigning users of a communication system to ones of a plurality of user communities;

second means for defining, for each one of said user communities, communication permissions with respect to individual ones of the other user communities;

third means responsive to an attempted communication between two users for determining the two users' assigned communities;

fourth means responsive to the determination of the two user's assigned communities for determining from the second means whether the attempted communication is permitted, at (a) time of initiation of the attempted communication, and at (b) time of completion of the attempted communication, in response to having determined at the time of initiation that the attempted communication is permitted; and fifth means responsive to a determination that the attempted communication is permitted for enabling the communication, and further responsive to a determination that the attempted communication is not permitted for preventing the communication.

14. An arrangement comprising:

first means for assigning users of a communication system to ones of a plurality of user communities;

second means for defining, for each one of said user communities, communication permissions with respect to individual ones of the other user communities;

third means responsive to an attempted communication between two users for determining the two user's assigned communities, at (a) time of initiation of the attempted communication, and (b) time of completion of the attempted communication, in response to a determination at the time of initiation that the attempted communication is permitted;

fourth means responsive to the determination of the two user's assigned communities for determining from the second means whether the attempted communication is permitted between the two user's assigned communities, (a) at the time of initiation and between the two user's assigned communities determined at the time of initiation, and (b) at the time of completion and between the two user's assigned communities determined at the time of completion, in response to having determined at the time of initiation that the attempted communication is permitted; and fifth means responsive to a determination that the attempted communication is permitted for enabling the communication, and further responsive to a determination that the attempted communication is not permitted for preventing the communication.

15. A method of controlling communications between user communities, comprising the steps of:

assigning each person who is a user of a communication system to one of a plurality of user communities;

defining, for each one of said user communities, communication permissions with respect to individual ones of the other user communities;

identifying two users, in response to an attempted communication between persons who are the two users;

determining the two identified users' assigned communities;

determining from the defined permissions whether the attempted communication between the two persons is permitted, in response to the determination of the two users' assigned communities;

enabling the communication, in response to determining that the attempted communication is permitted; and preventing the communication, in response to determining that the attempted communication is not permitted.

16. The method of claim 15 wherein
the step of defining permissions comprises the step of defining the communication permissions for each pair of the user communities.

17. A method of controlling communications between user communities in a communication system including an arrangement that assigns each person who is a user of the communication system to one of a plurality of user communities, and an arrangement that defines, for each one of said user communities, communication permissions with respect to individual ones of the other user communities, comprising the steps of:
 identifying two users, in response to an attempted communication between persons who are the two users;
 determining the two identified users' assigned communities;
 determining from the defined permissions whether the attempted communication is permitted between the two persons, in response to the determination of the two users' assigned communities;
 enabling the communication, in response to determining that the attempted communication is permitted; and
 preventing the communication, in response to determining that the attempted communication is not permitted.

18. The method of claim 17 wherein
the step of determining whether the attempted communication is permitted comprises the step of
determining from the defined permissions whether the attempted communication is permitted between the two user's assigned communities.

19. The method of claim 17 for a communication system having a plurality of subsystems each serving at least one of the system users, and an arrangement in each one of the subsystems for defining, for each user community, permissions with respect to individual ones of the other user communities, wherein
the step of determining whether the attempted communication is permitted comprises the steps of
first determining from the permissions-defining arrangement of the subsystem serving a first one of the two users whether the attempted communication is permitted, and
second determining from the permissions-defining arrangement of the subsystem serving a second one of the two users whether the attempted communication is permitted; wherein
the step of enabling the communication comprises the step of
enabling the communication in response to determining from the permissions-defining arrangement of both the subsystem serving the first user and the subsystem serving the second user that the communication is permitted; and wherein
the step of preventing the communication comprises the step of
preventing the communication in response to determining from the permissions-defining arrangement of either the subsystem serving the first user or the subsystem serving the second user that the communication is not permitted.

20. The method of claim 19 for a communication system further having an arrangement in each subsystem that assigns each user of the communication system to one of the plurality of user communities, wherein
the step of determining two user's assigned communities comprises the steps of
determining the two user's assigned communities in the subsystem serving the first user, and
determining the two user's assigned communities in the subsystem serving the second user; wherein
the step of first determining comprises the step of
determining whether the attempted communication is permitted between the two user's assigned communities in the subsystem serving the first user; and wherein
the step of second determining comprises the step of
determining whether the attempted communication is permitted between the two users' assigned communities in the subsystem serving the second user.

21. A method of controlling communications between user communities in a communication system including an arrangement that assigns each user of the communication system to one of a plurality of user communities, and an arrangement that defines, for each one of said user communities, communication permissions with respect to individual ones of the other user communities, comprising the steps of:
 determining two users' assigned communities, in response to an attempted communication between the two users;
 determining from the defined permissions whether the attempted communication is permitted, in response to the determination of the two user's assigned communities;
 enabling the communication, in response to determining that the attempted communication is permitted;
 enabling the communication irrespective of the defined permissions, in response to an overriding permission having been specified for the attempted communication; and
 preventing the communication in response to both (a) determining that the attempted communication is not permitted and (b) an overriding permission not having been specified for the attempted communication.

22. A method of controlling communications between user communities in a communication system including an arrangement that assigns each user of the communication system to one of a plurality of user communities, and an arrangement that defines, for each one of said user communities, communication permissions with respect to individual ones of the other user communities, comprising the steps of:
 determining two users' assigned communities, in response to an attempted communication between the two users;
 determining at time of initiation of the attempted communication whether the attempted communication is permitted, in response to the determination of the two user's assigned communities;
 determining at time of completion of the attempted communication whether the attempted communication is permitted, in response to having determined at the time of initiation that the attempted communication is permitted;

enabling the communication, in response to determining that the attempted communication is permitted; and preventing the communication, in response to determining that the attempted communication is not permitted.

23. A method of controlling communications between user communities in a communication system including an arrangement that assigns each user of the communication system to one of a plurality of user communities, and an arrangement that defines, for each one of said user communities, communication permissions with respect to individual ones of the other user communities, comprising the steps of:

determining two user's assigned communities at time of initiation of an attempted communication between the two users, in response to the attempted communication;

determining the two user's assigned communities at time of completion of the attempted communication, in response to a determination at the time of initiation that the attempted communication is permitted;

determining from the defined permissions at the time of initiation whether the attempted communication is permitted between the two user's assigned communities determined at the time of initiation, in response to the determination of the two user's assigned communities;

determining from the defined permissions at the time of completion whether the attempted communication is permitted between the two user's assigned communities determined at the time of completion, in response to a determination at the time of initiation that the attempted communication is permitted;

enabling the communication, in response to determining that the attempted communication is permitted; and preventing the communication, in response to determining that the attempted communication is not permitted.

* * * * *